US007497779B2

(12) United States Patent
O'Leary et al.

(10) Patent No.: US 7,497,779 B2
(45) Date of Patent: Mar. 3, 2009

(54) VIDEO GAME INCLUDING TIME DILATION EFFECT AND A STORAGE MEDIUM STORING SOFTWARE FOR THE VIDEO GAME

(75) Inventors: Danny J. O'Leary, Orlando, FL (US); Theodore Newman, Orlando, FL (US); Adam L. M. Smith, Orlando, FL (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/125,410

(22) Filed: May 10, 2005

(65) Prior Publication Data
US 2006/0094501 A1 May 4, 2006

Related U.S. Application Data

(60) Provisional application No. 60/569,249, filed on May 10, 2004.

(51) Int. Cl.
*A63F 9/24* (2006.01)
(52) U.S. Cl. .................... 463/32; 463/30; 463/1
(58) Field of Classification Search .................. 463/23, 463/32, 1, 30
See application file for complete search history.

(56) References Cited
U.S. PATENT DOCUMENTS

| 5,659,232 | A | 8/1997 | Taylor | |
|---|---|---|---|---|
| 6,154,251 | A | 11/2000 | Taylor | |
| 6,195,086 | B1* | 2/2001 | Perlman et al. | 345/213 |
| 6,331,871 | B1 | 12/2001 | Taylor | |
| 2002/0090994 | A1* | 7/2002 | Kaido et al. | 463/30 |
| 2003/0190950 | A1 | 10/2003 | Matsumoto | |
| 2003/0190951 | A1* | 10/2003 | Matsumoto | 463/30 |
| 2003/0195028 | A1* | 10/2003 | Glavich | 463/16 |

OTHER PUBLICATIONS

Grand Theft Auto (video game). online. accessed Sep. 1, 2006. http://en.wikipedia.org/wiki/Grand_Theft_Auto_(video_game).*
Bullet Time. Online. Accessed Sep. 1, 2006. http://en.wikipedia.org/wiki/Bullet_Time.*
Mr. Wongs. Grand Theft Auto III Miscellaneous Guide. Oct. 3, 2003. Online. Avalaible: http://www.gtaforums.com/index.pht?act=Print&client=printer&f=4&t=114399.*
Bubble Struggle. Wikipedia, the free encyclopedia. Online. Available: http://en.wikipedia.org/wiki/Bubble_Struggle.*
Bubble Trouble, how to Play. Online. Available: http://www.bubble-struggle.com/howto.htm.*
Grand Theft Auto Information. Gouranga!- A GTA News & Resource Cite. Online. Available: http://www.gouranga.com/nf-info-gta.htm.*

(Continued)

*Primary Examiner*—John M Hotaling, II
*Assistant Examiner*—Damon Pierce
(74) *Attorney, Agent, or Firm*—Nixon & Vanderhye, PC

(57) ABSTRACT

The passage of time and/or the laws of physics may be changed depending on the state of a game character. For example, the slowing down of the game world may provide the game character with special abilities move quickly in a very short period of "game world" time.

12 Claims, 9 Drawing Sheets
(3 of 9 Drawing Sheet(s) Filed in Color)

OTHER PUBLICATIONS

Examiner affidavit on Bubble Struggle.*
"Game Noir: The Construction of Virtual Subjectivity In Computer Gaming," Davis, Galen; <http://www.gamasutra.com/education/theses/20020821/davis.pdf>, May 2002, pp. 65-67.
"Max Payne 2: The Fall of Max Payne," <http://www.xbox.com/en-us/maxpayne2/firstencounter.htm>, printed Jul. 9, 2004, pp. 1-3.
"Alter Echo," <http://www.alterecho.com>, printed Jul. 9, 2004, p. 1.

* cited by examiner

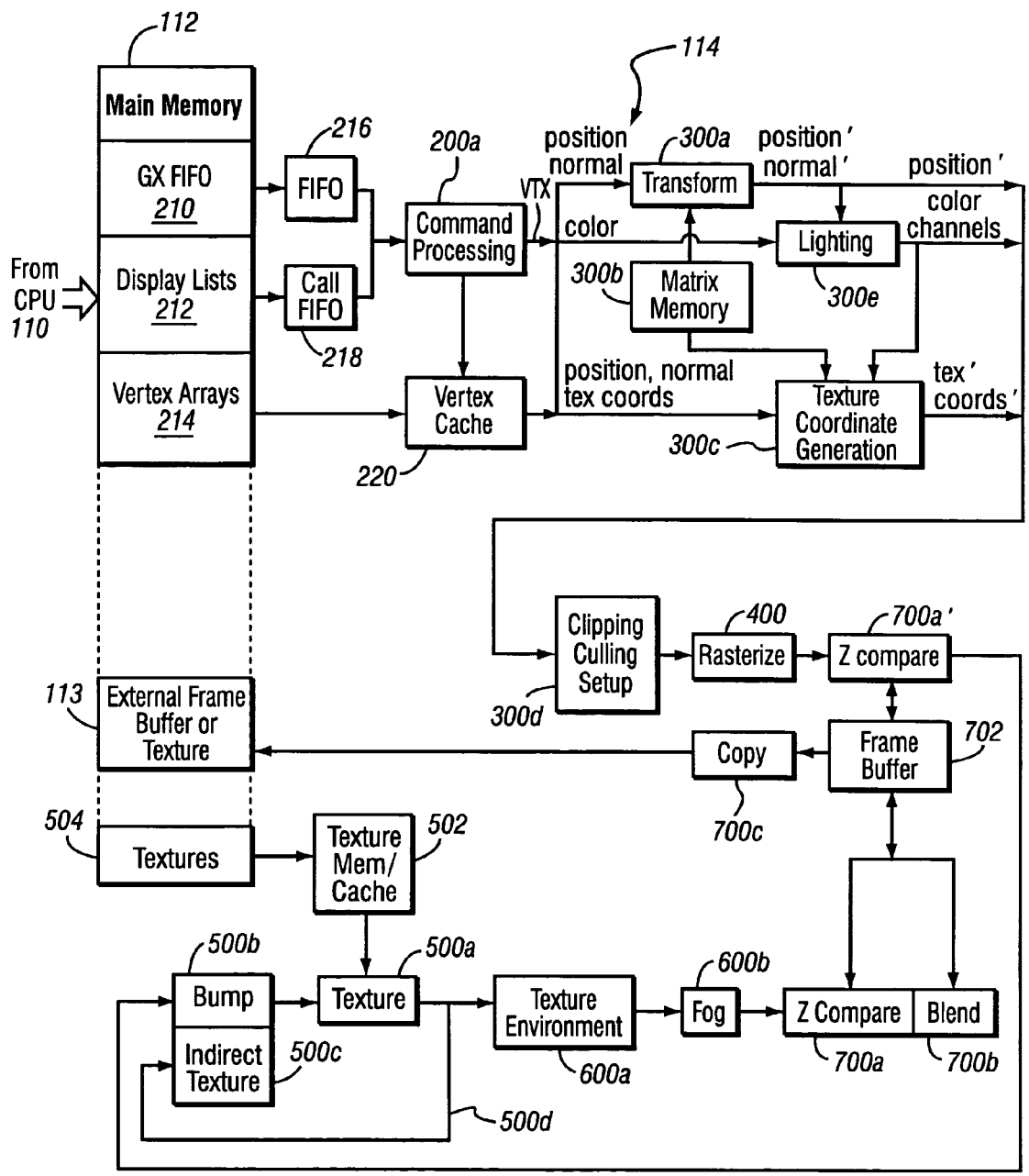
Fig. 5   EXAMPLE GRAPHICS PROCESSOR FLOW

VIDEO GAME INCLUDING TIME DILATION EFFECT AND A STORAGE MEDIUM STORING SOFTWARE FOR THE VIDEO GAME

RELATED APPLICATIONS

This application claims the benefit of U.S. Provisional Application No. 60/569,249, filed May 10, 2004, the contents of which are incorporated herein in their entirety.

BACKGROUND AND SUMMARY

This application generally relates to a video game and, more particularly, to a video game including a time dilation effect. The application also describes a storage medium storing software for such a video game.

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional (3D) graphics just a few years ago were mostly limited to expensive specialized flight simulators, high-end graphics workstations and supercomputers. The public saw some of the images generated by these computer systems in movies and expensive television advertisements, but most couldn't actually interact with the computers doing the graphics generation. All this has changed with the availability of relatively inexpensive 3D graphics platforms such as, for example, the Nintendo GameCube® and various 3D graphics cards now available for personal computers. It is now possible to interact with exciting 3D animations and simulations on relatively inexpensive computer graphics systems in home or office.

This application describes an example video game that can be played on 3D graphics platforms. Although not limited in this respect, the example video game is a first person game in which the player plays the game as if he or she looking out of his or her own eyes. The video game involves a ghost that is capable of "possessing" various hosts such as game characters and game objects in order to accomplish game objectives. When the ghost possesses a host, the game view is shifted to that of the possessed host. That is, the player sees the game world through the eyes or viewpoint of the possessed host. In one aspect of the example video game, when the player is in ghost form, the ghost is able to move much faster than other characters in the game. To simulate this, the 'real game world' is slowed down. This slowing down of the game world provides the ghost with special abilities to move quickly in a very short period of "game world" time. Thus, for example, a ghost can race past other characters in order to lay traps or to assist the other characters.

In another aspect of the example video game, the laws of physics may vary depending on whether the player is in ghost form or possessing a host. For example, when the player is in ghost form and the real world has been slowed down, certain changes may be made to the laws of motion to provide enhanced visual effects. For example, objects propelled by an explosion might travel higher and further in the slowed down game world view than in the normal game world view. Of course, while the slowing of time and changing of the laws of physics are used in combination in this example, these features may in fact be used separately from one another.

These and other features and advantages will be better and more completely understood by referring to the following detailed description of example embodiments in conjunction with the drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 5 is an example logical flow diagram of the FIG. 4 graphics and audio processor;

DETAILED DESCRIPTION OF EXAMPLE EMBODIMENTS

Figure 1:
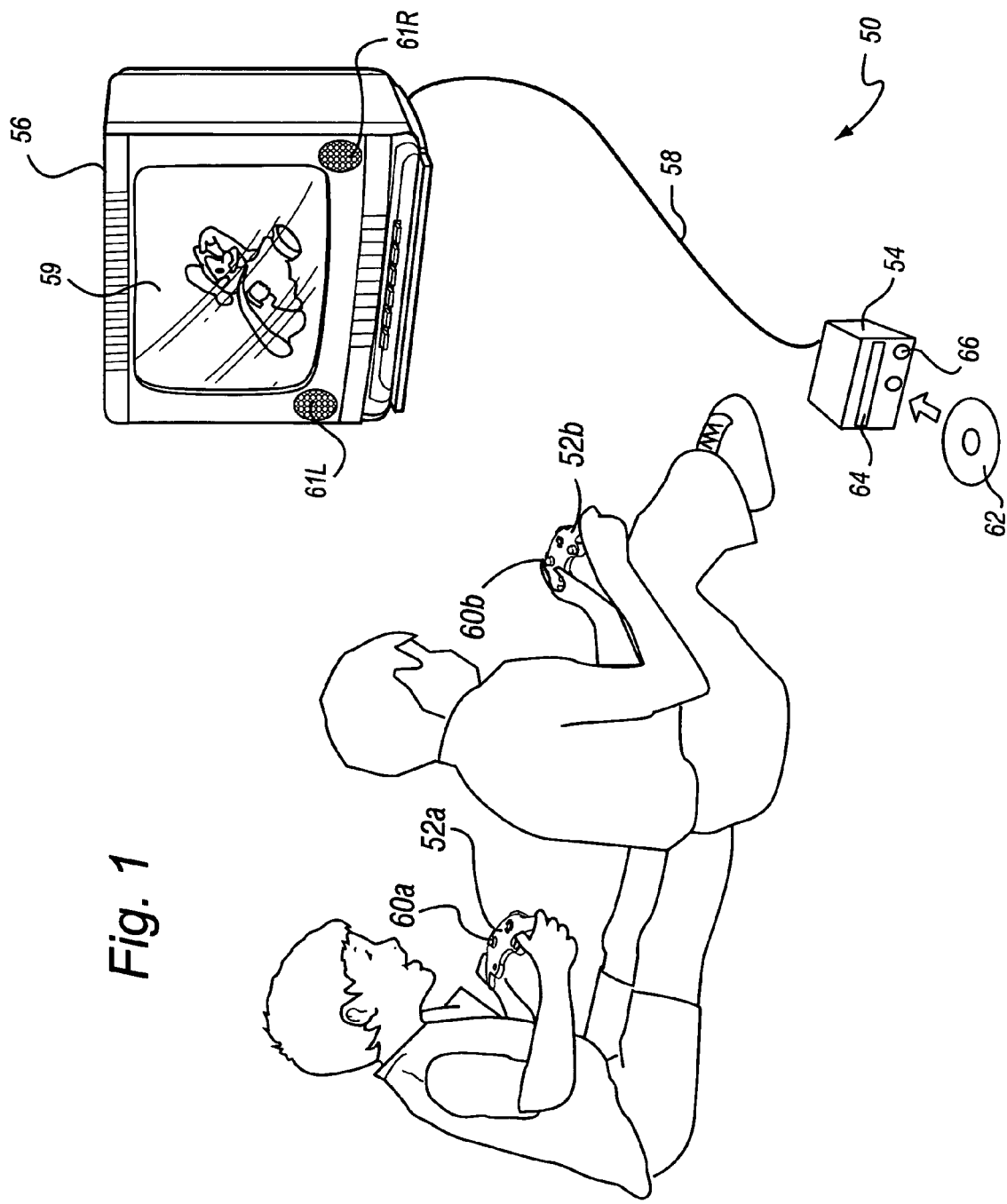
FIG. 1 is an overall view of an example interactive computer graphics system.

FIG. 1 shows an example interactive 3D computer graphics system 50 on which the video game described herein may be played. System 50 can be used to play interactive 3D video games with interesting stereo sound. It can also be used for a variety of other applications. In this example, system 50 is capable of processing, interactively in real time, a digital representation or model of a 3D world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., two-dimensional (2D) display generation and/or non-interactive display), but the capability of displaying quality 3D images very quickly can be used to create very realistic and exciting game play or other graphical interactions.

To play a video game or other application using system 50, the user or player first connects a main unit 54 to his or her color television set 56 or other display device by connecting a cable 58 between the two. Main unit 54 produces both video signals and audio signals for controlling color television set 56. The video signals control the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand-held controllers 52a, 52b to supply inputs to main unit 54. Controls 60a, 60b can be used, for example, to specify the direction (up or down, left or right, closer or further away) that a character displayed on television 56 should move within a 3D world. Controls 60a, 60b can also be used to provide input for other applications (e.g., menu selection, pointer/cursor control, etc.). Controllers 52 can take a variety of forms. In this example, controllers 52 each include controls 60 such as joysticks, push buttons and/or directional switches. Controllers 52 may be connected to main unit 54 by cables or wirelessly via electromagnetic (e.g., radio or infrared) waves.

Each controller 52 may also contain one or more vibration devices (not shown) that are selectively driven in accordance with control signals from main unit 54. When driven, these vibration units produce vibrations that are transmitted to the hand(s) of the player holding the controller. In this way, tactile sensations may be provided to players when vibration generating events occur during game play. Examples of vibration generating events include collisions, movement over a rough surface, accelerations, etc. Additional details of example controllers using vibration devices may be found in U.S. Pat. No. 6,676,520 and application Ser. No. 09/814,953, the contents of which are incorporated herein in their entirety.

To play an application such as a game, the user selects an appropriate storage medium 62 storing the video game or other application he or she wants to play, and inserts that storage medium into a storage medium receiving portion 64 in main unit 54. Storage medium 62 may, for example, be a specially encoded and/or encrypted optical and/or magnetic disk. Of course, in other implementations of the graphics system other memory devices such as semiconductor memories may be used. In still other implementations, the user may connect over a communication network such as the Internet to a remote computer storing game software. In the FIG. 1 implementation, the user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
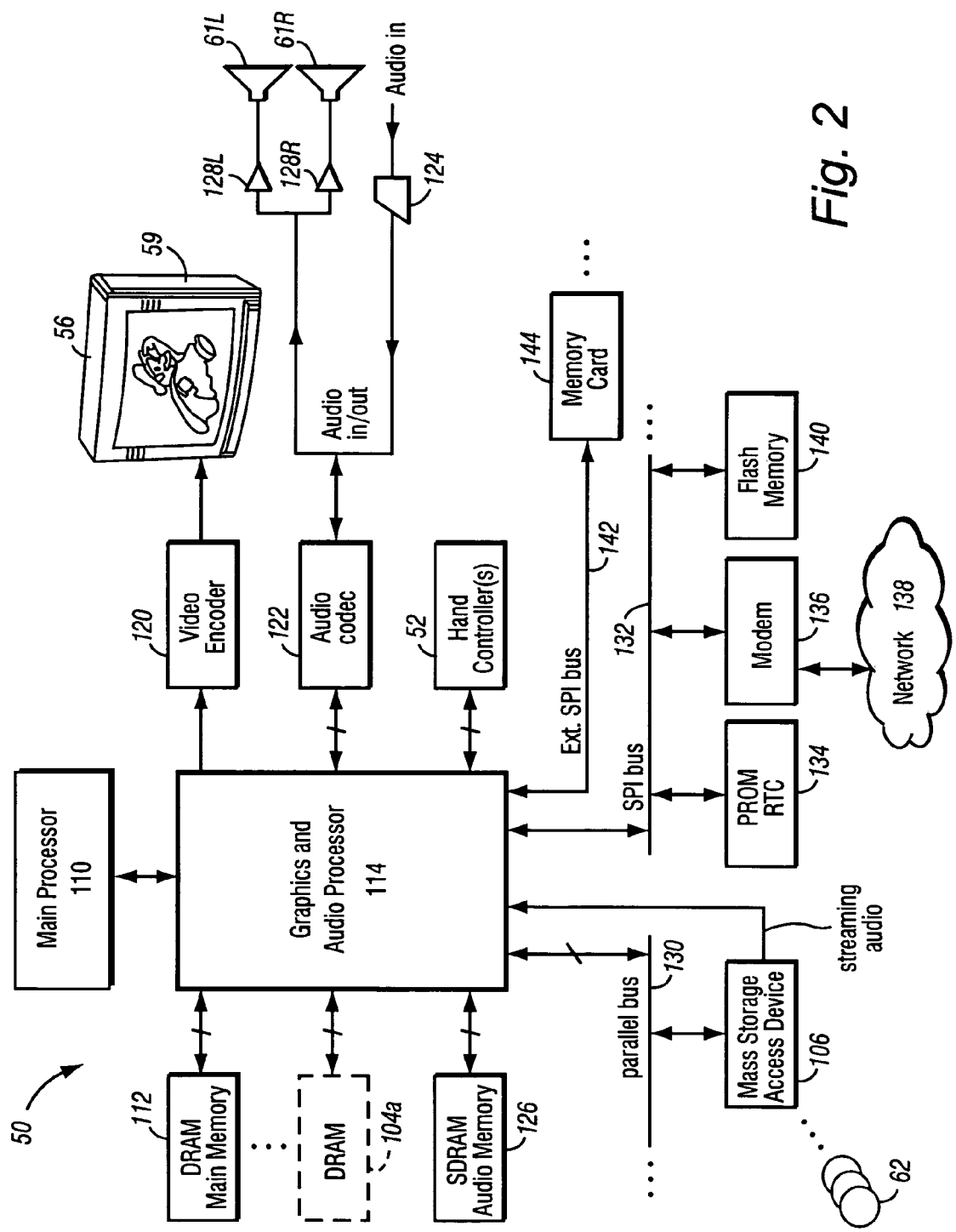
FIG. 2 is a block diagram of the FIG. 1 example computer graphics system.

FIG. 2 shows a block diagram of example components of system 50. The primary components include a main processor (CPU) 110, a main memory 112 and a graphics and audio processor 114. In this example, main processor 110 (e.g., an enhanced IBM Power PC 750) receives inputs from hand-held controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with. various additional devices that may be present within system 50. For example, a parallel digital bus 130 may be used to communicate with mass storage access device 106 and/or other components. A serial peripheral bus 132 may communicate with a variety of peripheral or other devices including, for example a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140. A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
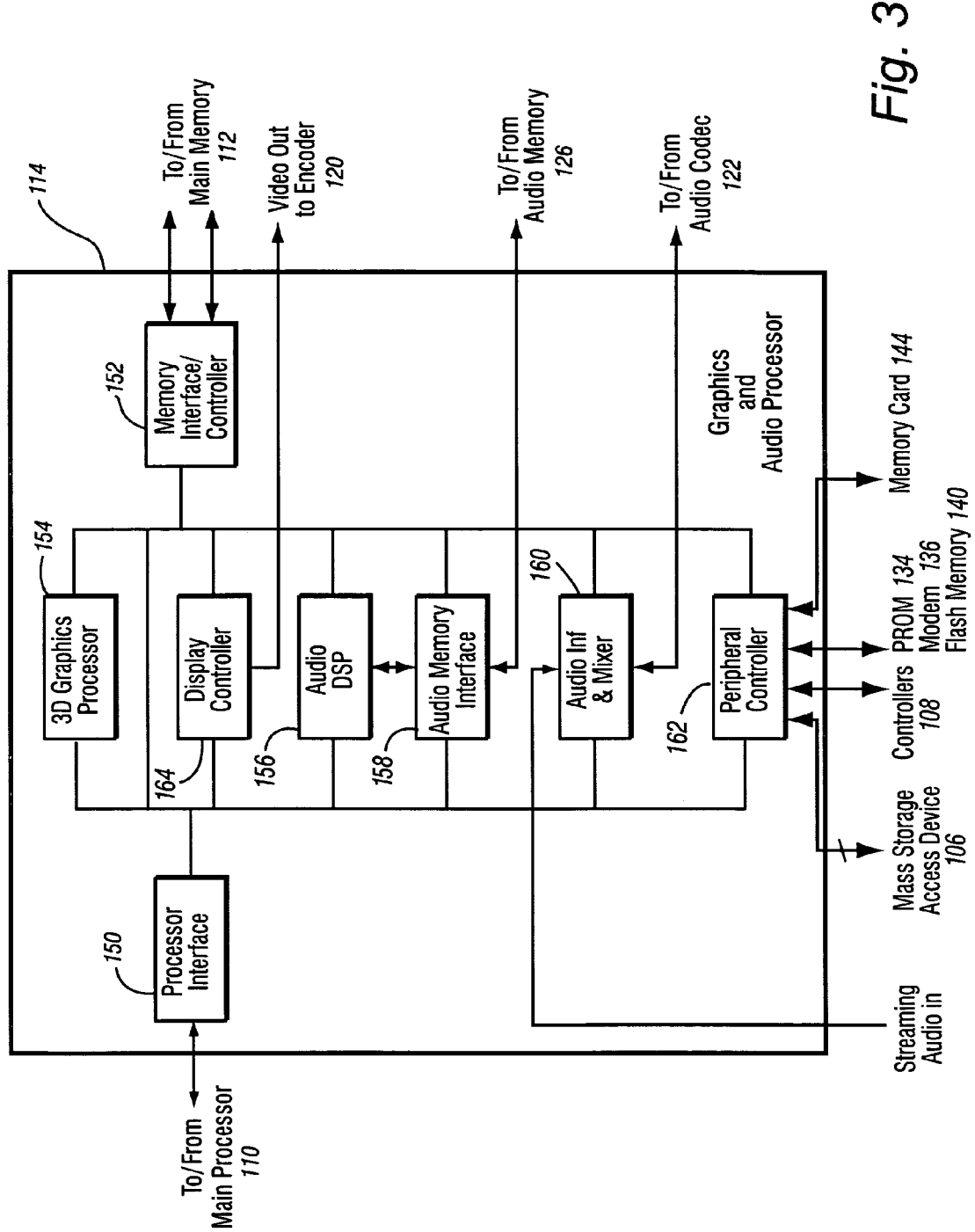
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
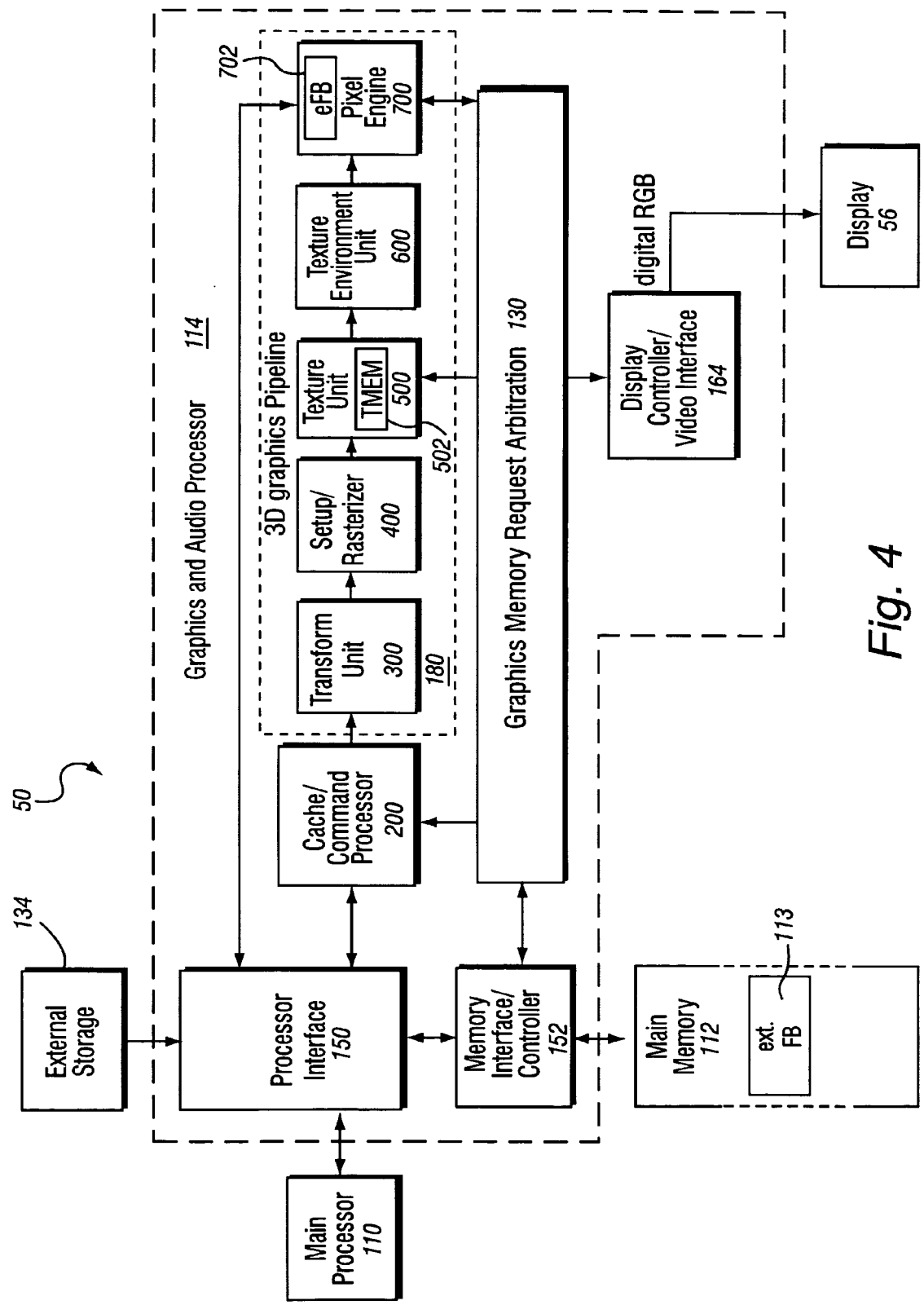
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache to minimize memory latency, and also has a write-gathering buffer for uncached data streams targeted for the graphics and audio processor 114. The write-gathering buffer collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches: (1) command streams from main memory 112 via an on-chip FIFO memory buffer 216 that receives and buffers the graphics commands for synchronization/flow control and load balancing, (2) display lists 212 from main memory 112 via an on-chip call FIFO memory buffer 218, and (3) vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include: a transform unit 300, a setup/rasterizer 400, a texture unit 500, a texture environment unit 600, and a pixel engine 700.

Transform unit 300 performs a variety of 2D and 3D transforms and other operations 300a (see FIG. 5). Transform unit 300 may include one or more matrix memories 300b for storing matrices used in transformation processing 300a. Transform unit 300 transforms incoming geometry per vertex from object or model space to homogenous eye space using a Modelview Matrix, and (after clipping 300d in clip space if desired) performs perspective scaling and screen coordinate conversion to provide resulting screen space (x, y, z) triplets for rasterization. Transform unit 300 also transforms incoming texture coordinates and computes projective texture coordinates (300c). Lighting processing 300e also performed by transform unit 300b provides per vertex lighting computations for up to eight independent lights in one example embodiment. Transform unit 300 can also perform texture coordinate generation (300c) for embossed type bump mapping effects.

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip embedded DRAM texture memory (TMEM) 502) performs various tasks related to texturing including for example: retrieving color and z textures 504 from main memory 112; texture processing (500a) including, for example, multi-texture handling, post-cache texture decompression, texture filtering (e.g., resampling to provide non-uniform and/or non-linear texture mapping), embossing, shadows and lighting through the use of projective textures, and BLIT with alpha transparency and depth; bump map processing for computing texture coordinate displacements for bump mapping, pseudo texture and texture tiling effects (500b); and indirect texture processing (500c). Generally speaking, texturing modifies the appearance of each location of a surface using some image, function or other data. As an example, instead of precisely representing the geometry of each brick in a brick wall, a two-dimensional color image of a brick wall can be applied to the surface of a single polygon. When the polygon is viewed, the color image appears where the polygon is located.

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending. Briefly, texture environment unit 600 in the example embodiment combines per-vertex lighting, textures and constant colors to form the pixel color and then performs fogging and blending including z blending for z textures. In an example embodiment, the color and alpha components have independent texture environment unit circuitry with independent controls. One set of texture environment color/alpha-combiners implemented in hardware can be reused over multiple cycles called texture environment stages (each having independent controls) to implement multi-texturing or other blending functions.

Pixel engine 700 stores color and depth data into an embedded (on-chip) DRAM (1TSRAM) frame buffer memory 702 including a color frame buffer and a depth buffer. Pixel engine 700 performs depth (z) compare (700a) and pixel blending (700b). Z compares 700a' can also be performed at an earlier stage in the graphics pipeline 180 (i.e., before texturing) depending on the rendering mode currently in effect (e.g., if alpha thresholding is not required). However, it is desirable, although not necessary, to provide z buffering at the end of the pipeline. The pixel engine 700 includes a copy operation 700c that periodically writes on-chip frame buffer 702 to main memory 112 for access by display/video interface unit 164. This copy operation 700c can also be used to copy embedded frame buffer color or z information to textures in the main memory 112 for dynamic color or z texture synthesis. Anti-aliasing and other filtering can be performed during the copy-out operation. The color frame buffer output of graphics pipeline 180 (which is ultimately stored in main memory 112) is read each frame by display/video interface unit 164. Display controller/video interface 164 provides digital RGB pixel values for display on display 102.

Additional details of example graphics system 50 may be found in U.S. Pat. Nos. 6,707,458 and 6,609,977, the contents of each of which are incorporated herein in their entirety.

Example Video Game

The discussion below is in the context of an example first person ghost game that may be played using example graphics system 50. In an illustrative embodiment, the executable instructions (program) for this video game are stored on a storage medium 62 that is operatively coupled to graphics system 50. Of course, the techniques and methods described herein are not limited to the example ghost game or the example graphics system and it will be readily recognized that these techniques and methods are readily applicable to many different types of video games and graphics systems. For example, the graphics systems are not limited to console systems as shown in FIG. 1 and may include hand-held devices, personal computers and emulators running on hand-held devices or personal computers. For example, an emulator may provide a hardware and/or software configuration (platform) that is different from the hardware and/or software configuration (platform) of graphics system 50. The emulator system might include software and/or hardware components that emulate or simulate some or all of hardware and/or software components of the system for which the application software was written. For example, the emulator system could comprise a hand-held device or a general purpose digital computer such as a personal computer which executes a software emulator program that simulates the hardware and/or firmware of graphics system 50.

The example ghost game is a first person game in which the player plays the game as if looking out of his or her own eyes. In the example ghost game, players search for a physical body, which is mysteriously being kept alive somewhere in an enormous compound. Players can explore the compound as a ghost which can travel through the human world virtually unseen, using its abilities to slip through cracks, interfere with electronics, move objects and the like. The ghost can "possess" a plurality of different characters or objects ("hosts"), thereafter using the hosts' weapons, equipment, skills, and even memories, to complete the goals. For example, the ghost may possess a soldier character in order to fight other characters or may possess an animal such as a dog or mouse to gain access to areas that might be inaccessible to human characters. The ghost may also possess game objects such as weapons or machine controls so that these objects can be controlled to achieve game objectives. Thus, in the example game, the player is a ghost and the ghost "possesses" or inhabits hosts such as game characters and game objects in order to accomplish game objectives. When the ghost possesses a host, the game view is shifted to the view of the possessed host.

Figure 6A:
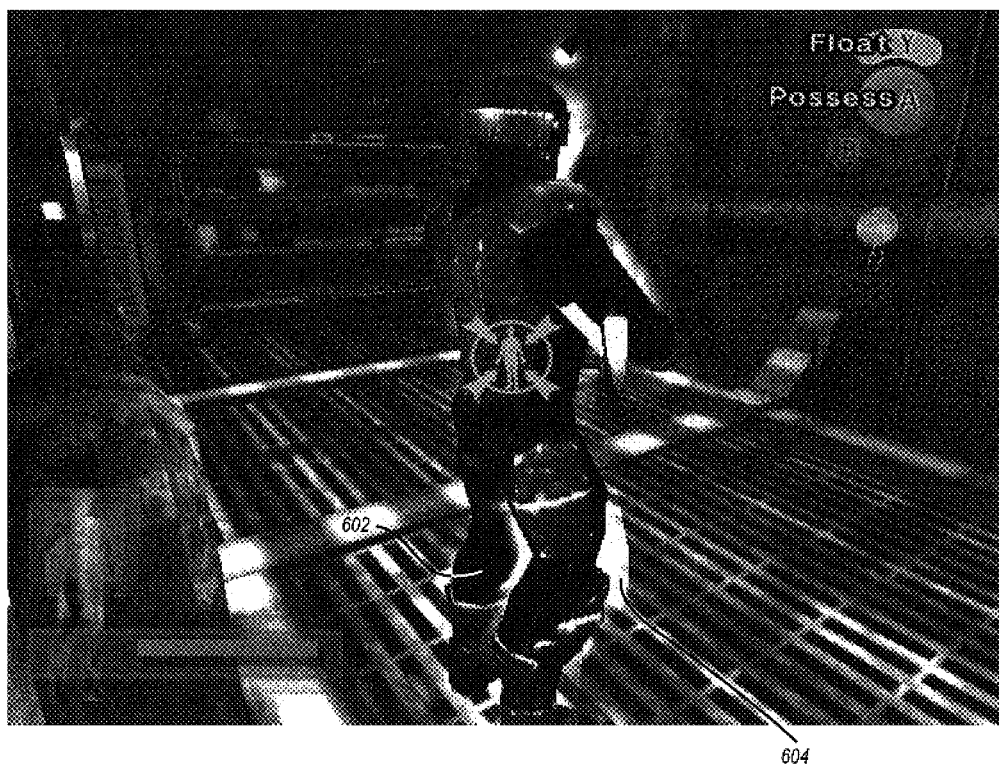
FIGS. 6A-6C show game characters having auras.
Figure 6B:
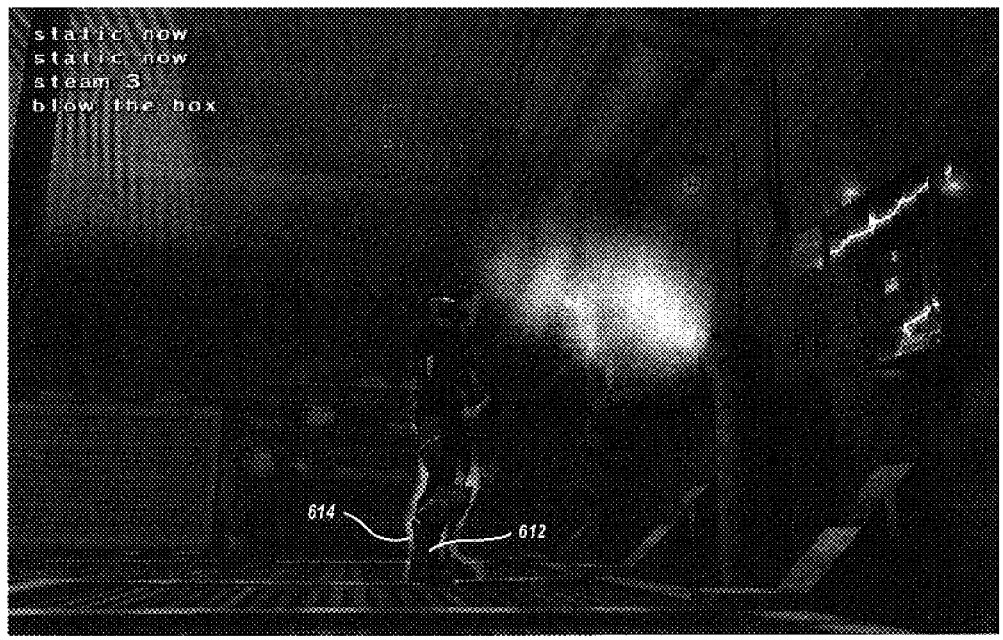
Figure 6C:
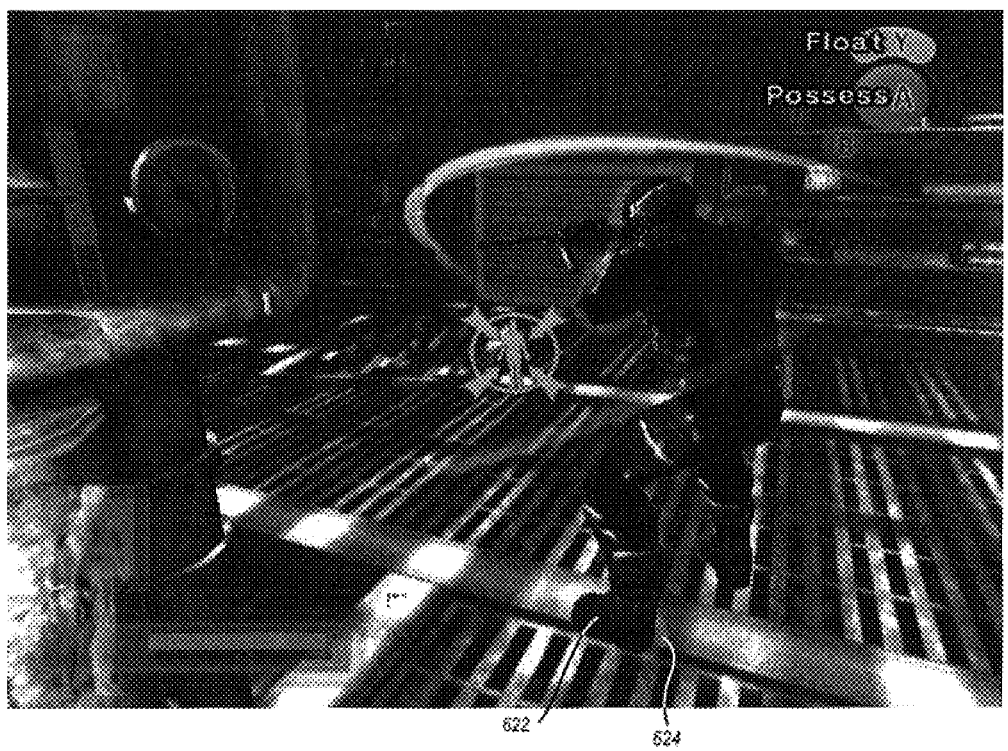

Generally speaking, the ghost may possess a host when the host has a predetermined "aura." In the case of game characters, these auras indicate the emotional state(s) of the characters. In the example game, when the player is in ghost form, the ghost can see the emotional states of potentially possessible characters by the colors of their auras. Auras visually surround at least part of a possessible host. FIG. 6A shows a character 602 having a white aura 604; FIG. 6B shows a character 612 having a yellow aura 614; and FIG. 6C shows a character 622 having a red aura 624. As noted above, the color of a character's aura indicates the emotional state of that character. For example, the white aura 604 indicates that character 602 has a confident emotional state. The yellow aura 614 indicates that character 612 has a wary emotional state. The red aura 624 indicates that character 622 has a frightened emotional state.

Of course, these colors and emotional states are provided by way of example, not limitation. In addition, although three emotional states are described, different numbers of emotional states may be used. For example, characters may be limited to having either confident or frightened emotional states and auras of two different colors may be used to represent these two different emotional states. Alternatively, in the case of two different emotional states, an aura may be provided only when the character is in one or the other of the emotional states. In a still further example, different characters may have different numbers and/or types of auras.

The ghost can posses a host by frightening the potential character to change its aura from white or yellow to red. By way of example, the potential host may be character 612 shown in FIG. 6B who may initially have a white (confident) aura. The ghost may cause steam to be emitted from a steam pipe as shown in FIG. 6B by, for example, possessing or inhabiting the steam pipe. This will cause the aura of character 612 to become yellow, indicating that the character is now in a wary emotional state. The inability of the character to stop the steam emission or escape from the chamber in which the steam is being emitted may subsequently cause the aura to become red, at which point the ghost may possess the character. By way of further example, a potential host may be a character may be typing at a laptop computer. The unseen ghost may, for example, possess or inhabit the laptop and thereafter close or turn off the laptop while the character is typing, frightening the character and changing the color of the character's aura from white to yellow. The character may then try to escape from the room in which the character was working. If the ghost has locked the door, the character's aura may change from yellow to red. At this point, the ghost may posses the character.

The character preferably maintains a yellow or red aura only for a predetermined period of time. For example, if the steam emission were to be stopped after the aura of character 612 turned yellow, the aura would preferably revert to white after some predetermined time period (e.g., ten seconds). Similarly, a red aura would revert back to a yellow aura after a predetermined period of time.

As noted above, objects such as weapons, computers, steam meters, etc. may be possessed in order to frighten potential host characters. In some cases, these objects may always be possessible, in which case they could always have a red aura or could have no aura at all. In other cases, certain objectives and/or goals may need to be achieved in order to make an object possessible. In this case, the aura of the object may be changed from one color (e.g., white) to another color (e.g., red) to indicate that the object is possessible after the objectives or goals are attained. Thus, in the case of objects, auras would not typically be indicative of an "emotional state", but rather whether the object was possessible or not.

Possession may be accomplished in one example implementation by selecting the character to be possessed using the positioning controls of the controller 52 to position a cursor or other indicator on the character and then pressing a "possess" key of the controller. As shown in FIG. 6C, for example, the upper right-hand portion of the game display may provide guidance information which indicates that pressing the "A" key on the controller 52 will cause the ghost to possess character 622. Guidance information may be context sensitive so that it is relevant to actions currently available to the player. Thus, guidance information for possessing a host may be displayed when there is a host capable of being possessed.

Guidance information for "dispossessing" a host may be displayed when a host is possessed.

As noted above, during game play, a player may be in ghost form or may possess various hosts. In the example video game, when the ghost has possessed a host, time passes normally in the game world. However, when the player is in ghost form, time is slowed down in the game world except for the ghost. This enables the ghost to, among other things, move faster than the others characters in the game. This slowing down of time can be practically implemented by scaling time change values provided to the parts of the game program code other than those parts that generate the display of the ghost character.

Figure 7A:
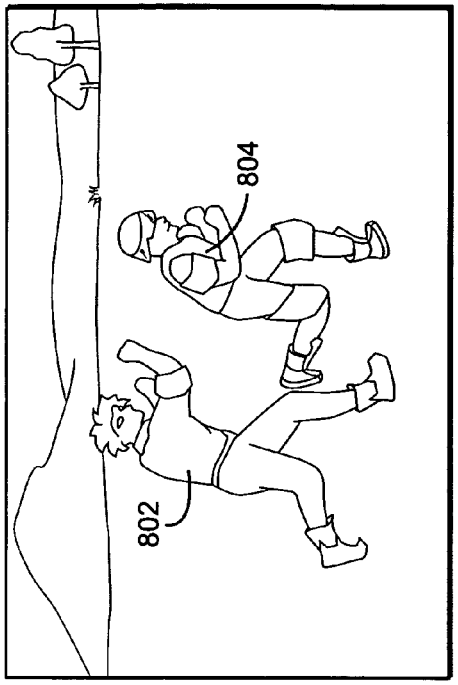
FIGS. 7A-7D illustrate the time dilation effect of the example video game.
Figure 7B:
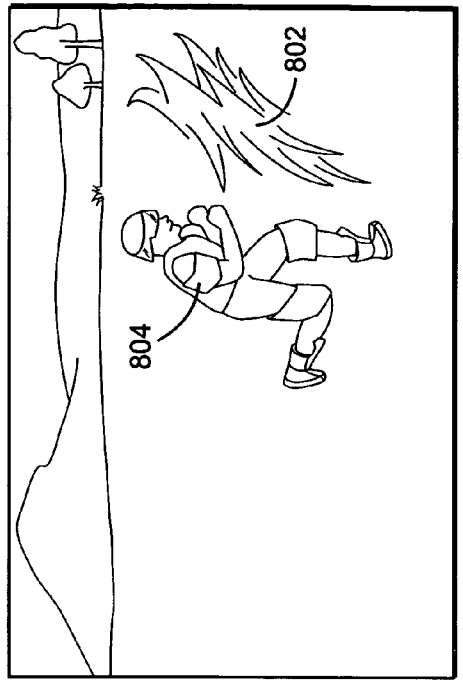
Figure 7C:
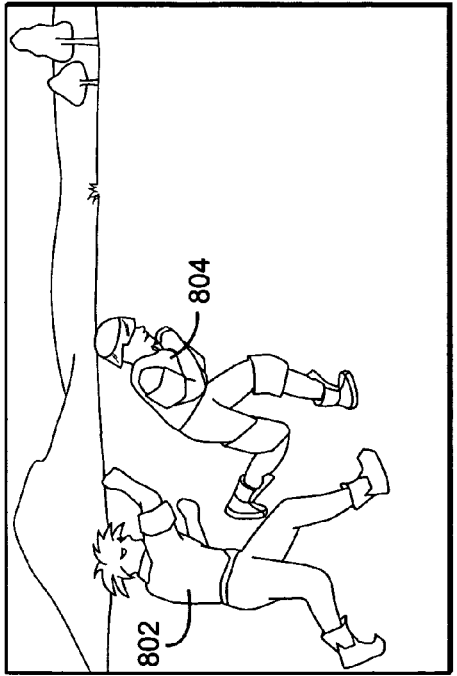
Figure 7D:
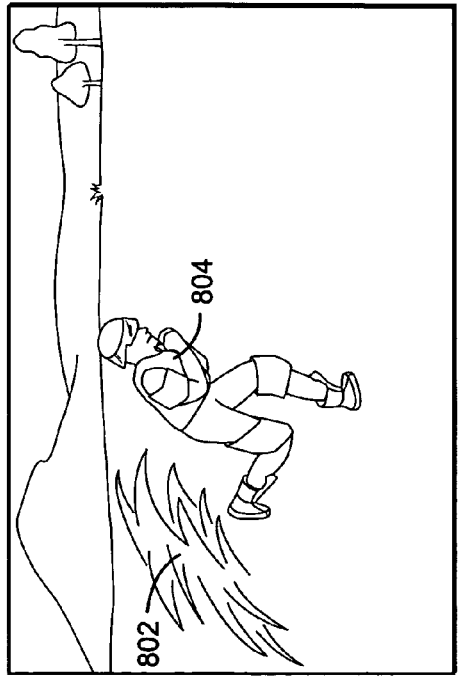

The slowing down of time will be further explained with reference to FIGS. 7A-7D. In FIGS. 7A and 7B, the ghost has possessed host character 802. Consequently, as noted above, time passes normally in the game world. Thus, in FIG. 7A, possessed character 802 is chasing character 804 and at some time T later in FIG. 7B, character 802 has still not caught up with character 804. In FIGS. 7C and 7D, character 802 is a ghost and the ghost is chasing character 804. However, because time is slowed down in the real world, ghost 802 is able to catch up to and pass character 804 (see FIG. 7D) by the time character 804 reaches the same point as in FIG. 7B. By way of example, the time change value for character 804 may be scaled so that ghost 802 moves at twice the speed of character 804. Of course, this particular example of scaling is provided by way of example, not limitation.

Thus, as seen by the ghost, the game world runs slowly. In one example implementation, when a ghost dispossesses a host, the slowing of time does not occur abruptly, but rather slows down at a predetermined rate. Similarly, when a ghost possesses a host, time does not speed up abruptly, but rather speeds up at a predetermined rate. By way of example, not limitation, these predetermined rates may be determined so that the time speeds up or slows down over a period of about 1 to about 10 seconds. These predetermined rates are adjustable so that the slowing down and/or speeding up of time may be quite jarring or so that the slowing down and/or speeding up is relatively smooth.

The slowed down game world can be incorporated into game play. For example, the ghost may possess a host (such as an inanimate object) in order to scare a character. As a result of being scared, the character may begin to run, for example, down a hallway. If the player were to continue to possess a host while the character is running, the character might leave the scene and not be caught in time to be possessed. However, in the example video game described herein, as soon as the ghost leaves the possessed host, time slows down and the ghost can then catch up with and/or pass the running character and then, for example, possess the character.

Another illustrative use of the time dilation feature involves possessing projectiles. For example, a player possessing a host could fire a weapon and then thereafter dispossess the host. Because time in the real world is slowed down after dispossession, the ghost can actually catch up to and possess the projectile fired from the weapon (assuming the projectile is defined by the game program as being a possessible host). Once the projectile is possessed, it might then be steered and controlled by the player, allowing for more accurate aim. Indeed, the projectile could even be steered so as to be aimed at the host that fired the weapon.

In the example video game, game world time is slowed down when the ghost possesses a host. In an alternative implementation, game world time may be sped up when the ghost is in ghost form so that ghost moves slower than other characters. It is also possible that the game world time may speed up when the ghost is in ghost form at certain points in the game and that game world time may slow down when the ghost is in ghost form at certain other points in the game. These different points may, for example, be at different game levels.

In addition to time running more slowly, the "laws of physics" may be dependent at least in part on whether a player is viewing the world in ghost form or via a possessed host. For example, when the player views the world in ghost form, an explosion may cause an object or character to be propelled further and/or higher than the object or character would be propelled if the player were viewing the world via a possessed host. The changing of the laws of physics when the player views the world in ghost form enables better visual effects during game play. Of course, it will be apparent that the change in the laws of physics may be used for purposes other than simply providing better visual effects. For example, the changes can be integrated into the game play so that a player can accomplish objectives as a ghost using these changed laws that cannot be accomplished (or can be accomplished only with great difficulty) when the ghost possesses a host. Thus, for example, a ghost in ghost form may be able to shoot weapons at an enemy over a longer distance than is possible when the ghost possesses a host.

With respect to the laws of physics, the game program may include instructions and parameters that fix the laws in the world as viewed in ghost form and the world as viewed via a possessed host. For example, motion as viewed via a possessed host may be governed by the normal Newtonian laws of motion. However, motion as viewed in ghost form may be governed by modified laws of motion in order to produce the effects described above and other effects. For example, the gravitational constant in the equations for projectile motion may be scaled to be $2/3$ of its normal value so that projectiles will reach higher heights and/or go greater distances. Alternatively, the projectile may be given greater energy when the ghost is in ghost form than when the ghost possesses a host. This greater energy will also enable the projectile to reach greater heights and/or go further distances.

In the example embodiment, the rates at which time speeds up and slows down when a player dispossesses and possesses a character are determined in accordance with parameters and instructions in the video game program. However, the video game is not limited in this respect and these slow down/speed up rates may be user configurable. In addition, the speed up/slow down rates need not be equal to each other and may differ for each host, if desired.

Similarly, in the example embodiment, the laws of physics in the slowed down world are determined in accordance with parameters and instructions in the game program. Here again, these parameters and instructions for the laws of physics may be user configurable.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A video game comprising:
    a ghost game character capable of possessing and dispossessing a plurality of different host game characters during game play wherein a game world view shifts to a view of a possessed host game character; and
    a time change effect for changing the rate at which time passes in the game world between a first rate when the ghost game character possesses one of the host game characters and a second rate when the ghost game character dispossesses one of the host game characters, wherein the changing between the first and second rates occurs gradually.

2. A video game comprising:

a ghost game character capable of possessing and dispossessing a plurality of different host game characters during game play wherein a game world view shifts to a view of a possessed host game character; and a physics change effect for changing the laws of physics in the game world in dependence on whether the ghost game character possesses or dispossesses one of the host game characters.

3. The video game according to claim 1, wherein the first rate is greater than the second rate.

4. A storage medium storing video game instructions executable by a graphics system to play a video game, the video game comprising:

a ghost game character capable of possessing and dispossessing a plurality of different host game characters during game play wherein a game world view shifts to a view of a possessed host game character; and a time change effect for changing the rate at which time passes in the game world between a first rate when the ghost game character possesses one of the host game characters and a second rate when the ghost game character dispossesses one of the host game characters, wherein the changing between the first and second rates occurs gradually.

5. The storage medium according to claim 4, wherein the video game instructions are executable by a hand-held graphics system.

6. The storage medium according to claim 4, wherein the video game instructions are executable by a video game console.

7. The storage medium according to claim 4, wherein the video game instructions are executable by a personal computer.

8. The storage medium according to claim 4, wherein the video game instructions are executable by a personal computer running an emulator program.

9. A storage medium storing video game instructions executable by a graphics system to play a video game, the video game comprising:

a ghost game character capable of possessing and dispossessing a plurality of different host game characters during game play wherein a game world view shifts to a view of a possessed host game character; and a physics change effect for changing the laws of physics in the game world in dependence on whether the ghost game character possesses or dispossesses one of the host game characters.

10. The storage medium according to claim 4, wherein the first rate is greater than the second rate.

11. A video game method comprising:

controlling a ghost game character to possess host game characters during game play wherein a game world view shifts to a view of a possessed host game character;

gradually speeding up the rate at which time passes in the game world when the ghost game character possesses one of the host game characters;

controlling the ghost game character to dispossess the one of the host game characters; and gradually slowing down the rate at which time passes in the game world when the ghost game character dispossesses the one of the host game characters.

12. A video game method comprising:

controlling a ghost game character to possess host game characters during game play wherein a game world view shifts to a view of a possessed host game character;

setting first laws of physics in the game world when the ghost game character possesses one of the host game characters;

controlling the ghost game character to dispossess the one of the host game characters; and setting second laws of physics in the game world when the ghost game character dispossesses the one of the host game characters.

* * * * *